(12) United States Patent
Kwak et al.

(10) Patent No.: US 10,306,402 B2
(45) Date of Patent: May 28, 2019

(54) METHOD AND APPARATUS FOR PROVIDING NOTIFICATION INFORMATION

(71) Applicant: Samsung Electronics Co., Ltd., Gyeonggi-do (KR)

(72) Inventors: Byung-Chang Kwak, Seoul (KR); Jun-Ho Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 14/979,783

(22) Filed: Dec. 28, 2015

(65) Prior Publication Data

US 2016/0192134 A1    Jun. 30, 2016

(30) Foreign Application Priority Data

Dec. 24, 2014 (KR) .................. 10-2014-0188283

(51) Int. Cl.
*H04W 4/02* (2018.01)
*H04W 4/021* (2018.01)

(52) U.S. Cl.
CPC .......... *H04W 4/021* (2013.01); *H04W 4/023* (2013.01)

(58) Field of Classification Search
CPC ....... H04W 4/02; H04W 4/021; H04W 4/023; H04W 4/025
See application file for complete search history.

(56) References Cited

U.S. PATENT DOCUMENTS

| 8,725,180 B2* | 5/2014 | Lee .................. G06F 17/30867 455/403 |
| 2003/0006913 A1* | 1/2003 | Joyce ................. G06Q 20/3224 340/994 |
| 2004/0203746 A1* | 10/2004 | Knauerhase .... H04M 1/274516 455/432.1 |
| 2005/0009508 A1* | 1/2005 | Graske ................. H04M 3/487 455/414.3 |
| 2005/0032529 A1* | 2/2005 | Akama .................. H04W 8/08 455/456.2 |
| 2010/0153488 A1* | 6/2010 | Mittal ..................... H04W 4/02 709/203 |
| 2012/0089326 A1* | 4/2012 | Bouve ................ G01C 21/3697 701/411 |
| 2012/0173610 A1 | 7/2012 | Bleau et al. |

(Continued)

FOREIGN PATENT DOCUMENTS

| KR | 1020100090201 | 8/2010 |
| KR | 101290977 | 7/2013 |
| KR | 1020130109229 | 10/2013 |

*Primary Examiner* — Dinh Nguyen
(74) *Attorney, Agent, or Firm* — The Farrell Law Firm, P.C.

(57) ABSTRACT

The present disclosure provides a method and an apparatus for providing notification information. The method includes identifying terminal location information in an area including a terminal; identifying at least one piece of setting location information in an area which is set by a user; providing corresponding first notification information when there occurs a notification event corresponding to the terminal location information; and providing at least one piece of corresponding second notification information when there occurs a notification event corresponding to the at least one piece of setting location information.

7 Claims, 7 Drawing Sheets

(56) References Cited

U.S. PATENT DOCUMENTS

2012/0190295 A1\* 7/2012 Kim ................ G06Q 10/06
            455/3.01
2014/0141808 A1\* 5/2014 Deng ................ H04W 4/029
            455/456.3
2015/0088524 A1\* 3/2015 Shin ................ G06F 3/167
            704/275

\* cited by examiner

METHOD AND APPARATUS FOR PROVIDING NOTIFICATION INFORMATION

PRIORITY

This application claims priority under 35 U.S.C. § 119(a) to Korean Application Serial No. 10-2014-0188283, which was filed in the Korean Intellectual Property Office on Dec. 24, 2014, the entire content of which is incorporated herein by reference.

BACKGROUND

1. Field of the Disclosure

The present disclosure generally relates to a method and an apparatus for providing notification information based on a location.

2. Description of the Related Art

As electronic devices, such as smart phones, tablets, and the like, become common, a content push service is utilized for various purposes. New applications which support a push service and which run on electronic devices are being developed.

Examples of applications which support the push service include location-based marketing services, location-based notification services, location-based broadcast push services, and the like.

A conventional location-based notification service utilizing a push service progresses in such a manner as to transmit information, which corresponds to a predetermined geographic area, to a terminal when the terminal enters the relevant geographic area.

SUMMARY

The present disclosure has been written in view of the aforementioned problems, and aspects of the present disclosure are to provide a method and apparatus in which a terminal can receive not only the location thereof but also information corresponding to various areas which are defined by the user.

An aspect of the present disclosure is to provide a method and apparatus in which a terminal can receive information (as an example, location information of an electronic device corresponding to preset contact information) corresponding to various areas which are defined by a user, and can transmit the received information to the electronic device corresponding to preset contact information.

In accordance with an aspect of the present disclosure, a method for providing notification information is provided. The method includes identifying terminal location information in an area including a terminal; identifying at least one piece of setting location information in an area which is defined by a user; providing corresponding first notification information when a notification event occurs corresponding to the terminal location information; and providing at least one piece of corresponding second notification information when a notification event occurs corresponding to the at least one piece of setting location information.

In accordance with an aspect of the present disclosure, a method for providing notification information is provided. The method includes identifying terminal location information in an area including a terminal; receiving, as input, an area which is defined by a user, and identifying at least one piece of setting location information in the area which is set by the user; receiving first notification information provided when a notification event occurs corresponding to the terminal location information; and receiving at least one piece of second notification information provided when a notification event occurs corresponding to the at least one piece of setting location information.

In accordance with an aspect of the present disclosure, an electronic device is provided. The electronic device includes a communication unit that is connected to a terminal and transmits/receives data; and a control unit that identifies terminal location information in an area including a terminal, identifies at least one piece of setting location information in an area which is defined by a user, provides corresponding first notification information when there notification event occurs corresponding to the terminal location information, and provides at least one piece of corresponding second notification information when a notification event occurs corresponding to the at least one piece of setting location information.

In accordance with an aspect of the present disclosure, an electronic device is provided. The electronic device includes a display unit that displays the notification information; a user input processing unit that provides a user interface and processes a user input; and a control unit that identifies terminal location information in an area including a terminal, receives an area, which is defined by a user, as input by using the user interface and identifies at least one piece of setting location information in the area which is defined by the user, receives and provides first notification information corresponding to the terminal location information, and receives and provides at least one piece of second notification information corresponding to the at least one piece of setting location information.

According to embodiments of the present disclosure, it is possible to receive notification information on not only an area in which the terminal is located, but also an area defined by the user.

The notification information on the area in which the terminal is located, and the area defined by the user can be received by the electronic device, thereby making notification information on multiple areas more easily acquired by the user.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
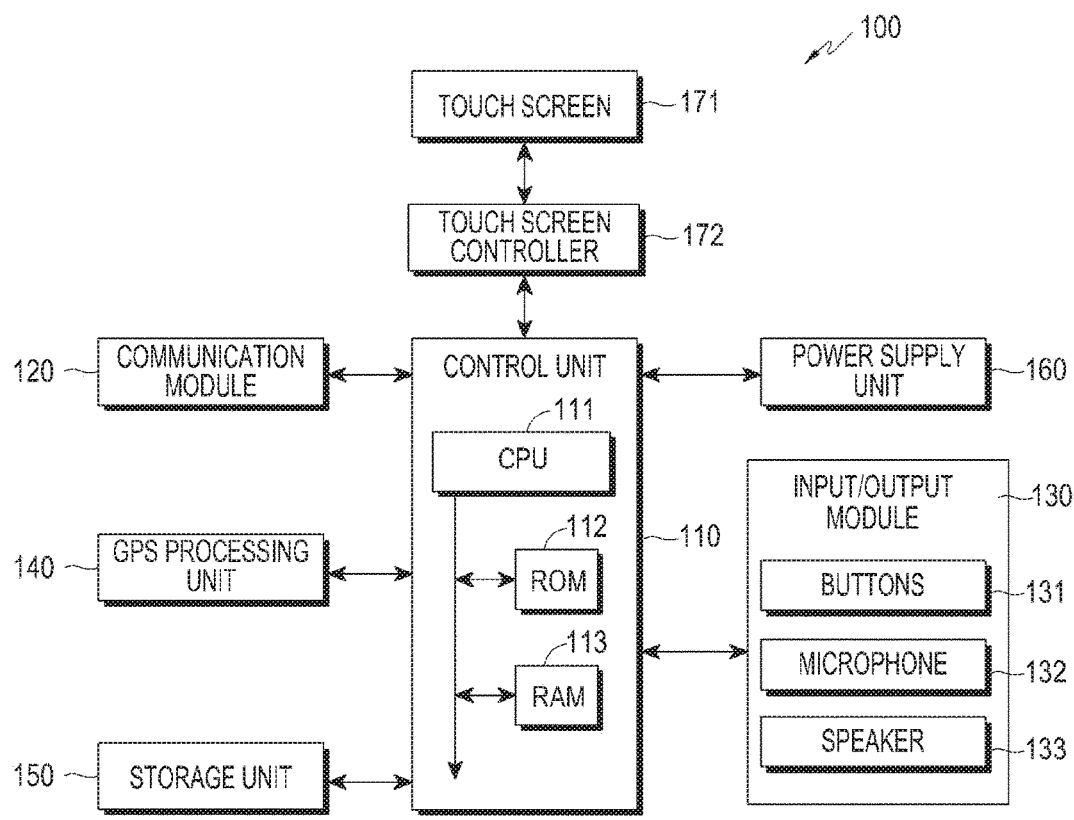
FIG. 1 is a block diagram schematically illustrating a configuration of a terminal to which a method for providing notification information is applied according to an embodiment of the present disclosure.

Embodiments of the present disclosure will be described herein below with reference to the accompanying drawings. However, it should be understood that there is no intent to limit the present disclosure to the particular forms disclosed herein; rather, the present disclosure should be construed to cover all modifications, changes, equivalent devices and methods, and/or alternative embodiments of the present disclosure. In describing the drawings, similar reference numerals may be used to designate similar constituent elements.

In the present disclosure, the expression "have", "may have", "include" or "may include" refers to existence of a corresponding feature (as an example, numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in embodiments of the present disclosure may modify components regardless of the order and/or the importance but does not limit the corresponding components. The above expressions are used merely for the purpose of distinguishing an element from the other elements. For example, a first user device and a second user device indicate different user devices although both of them are user devices. For example, a first element may be referred to as a second element, and similarly, a second element may be referred to as a first element without departing from the scope of the present disclosure.

It should be understood that when an element (as an example, first element) is referred to as being (operatively or communicatively) "connected," or "coupled," to another element (as an example, second element), it may be directly connected or coupled directly to the other element or any other element (as an example, third element) may be interposed between them. In contrast, it may be understood that when an element (as an example, first element) is referred to as being "directly connected," or "directly coupled" to another element (a second element), there are no element (a third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (as an example embedded processor) only for performing the corresponding operations or a generic-purpose processor (as an example, central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the same meanings as the contextual meanings in the relevant field of the art, and are not to be interpreted to have ideal or excessively formal meanings unless clearly defined in the present disclosure. In some cases, even terms defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (as an example, a head-mounted-device (HMD) such as electronic glasses, electronic clothes, an electronic bracelet, an electronic necklace, an electronic appcessory, electronic tattoos, or a smart watch).

According to an embodiment of the present invention, the electronic device may be a smart home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (as an example, Samsung HomeSync™, Apple TV™, or Google TV™), a game console (as an example, Xbox™ and PlayStation™), an electronic dictionary, an electronic key, a camcorder, and an electronic photo frame.

According to an embodiment of the present invention, the electronic device includes at least one of various medical devices (as an example, various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine, a navigation device, a Global Positioning System (GPS) receiver, an Event Data Recorder (EDR), a Flight Data Recorder (FDR), a Vehicle Infotainment Device, an electronic device for a ship (as an example, a navigation device for a ship, and a gyro-compass), avionics, security devices, an automotive head unit, a robot for home or industry, an automatic teller machine (ATM) in banks, point of sales (POS) terminals in a shop, or internet of things device (as an example, a light bulb, various sensors, electric or gas meter, a sprinkler device, a fire alarm, a thermostat, a streetlamp, a toaster, a sporting goods, a hot water tank, a heater, a boiler, etc.).

According to an embodiment of the present invention, the electronic device may further include at least one of a part of furniture or a building/structure, an electronic board, an electronic signature receiving device, a projector, and various measuring instruments (as an example, a water meter, an electric meter, a gas meter, and a radio wave meter). The electronic device may be a combination of one or more of the aforementioned various devices. The electronic device may be a flexible device. Further, the electronic device according to the present disclosure is not limited to the aforementioned devices, and may include a new electronic device according to the development of new technologies.

Hereinafter, an electronic device according to various embodiments of the present disclosure will be described with reference to the accompanying drawings. As used herein, the term "user" may indicate a person who uses an electronic device or a device (as an example, an artificial intelligence electronic device) that uses an electronic device.

FIG. 1 is a block diagram schematically illustrating a configuration of a terminal to which a method for providing notification information is applied according to an embodiment of the present disclosure.

Referring to FIG. 1, the terminal 100 includes a control unit 110, a communication module 120, an input/output module 130, a storage unit 150, a power supply unit 160, a touch screen 171, and a touch screen controller 172.

The control unit 110 includes a Central Processing Unit (CPU) 111, a Read-Only Memory (ROM) 112 that stores a control program and data for controlling the terminal 100, and a Random Access Memory (RAM) 113 that stores a signal or data received from outside the terminal 100, or is used as a memory area for a task performed by the terminal 100. The CPU 111, the ROM 112, and the RAM 113 may be interconnected by an internal bus. Also, the control unit 110 controls the communication module 120, the input/output module 130, a Global Positioning System (GPS) processing unit 140, the storage unit 150, the power supply unit 160, the touch screen 171, and the touch screen controller 172. Further, the control unit 110 includes a single-core processor, or includes multiple processors, such as a dual-core processor, a triple-core processor, a quad-core processor, and the like. The number of cores may be determined according to characteristics and requirements of the terminal 100 by those having ordinary knowledge in the technical field of the present disclosure.

The control unit 110 may receive media content to be uploaded to a content sharing server, which is selected by a user, and may allow the media content to be uploaded to the content sharing server. Then, the control unit 110 may receive information on a user input from the content sharing server, and may store the information on the user input in conjunction with the corresponding media content. When the media content is displayed, the control unit 110 may allow the media content to be displayed together with the information on the user input stored in conjunction with the media content.

The communication module 120 includes at least one of a cellular module, a Wireless Local Area Network (WLAN) module, and a short-range communication module.

In accordance with the control unit 110, the cellular module connects the terminal 100 to an external network through mobile communication by using at least one or more antennas. The cellular module transmits and receives wireless signals for voice calls, video calls, Short Message Service (SMS) messages, Multimedia Messaging Service (MMS) messages, and the like to/from a mobile phone, a smart phone, a tablet Personal Computer (PC) or another device, which has a telephone number associated with the terminal 100.

In accordance with the control unit 110, the WLAN module may be connected to the Internet through a wireless Access Point (AP). The WLAN module supports the WLAN standard IEEE 802.11x of the Institute of Electrical and Electronics Engineers (IEEE). The WLAN module may support and assist a Wi-Fi Positioning System (WPS) that identifies location information of the terminal 100 including the WLAN module by using position information provided by positioning server to which the WLAN module is wirelessly connected.

The short-range communication module is a module that allows the terminal 100 to wirelessly perform short-range communication with another terminal under the control of the control unit 110, and may perform communication based on a short-range communication scheme, such as Bluetooth communication, Infrared Data Association (IrDA) communication, Wi-Fi Direct communication, Near Field Communication (NFC), and the like.

The input/output module 130 includes at least one of buttons 131, a microphone 132, a speaker 133, a vibration motor a keypad, and a stylus pen.

The buttons 131 may be formed on a front surface, a lateral surface or a rear surface of a housing of the terminal 100, and includes at least one of a power/lock button, a volume button, a menu button, a home button (not illustrated), a back button, and a search button (not illustrated).

In accordance with the control unit 110, the speaker 133 may output sounds corresponding to various audio signals. The terminal 100 includes multiple speakers. The speaker 133 or the multiple speakers may be disposed at an appropriate position or appropriate positions of the housing of the terminal 100 for directing output sounds.

In accordance with the control unit 110, the vibration motor (not illustrated) may convert an electrical signal into a mechanical vibration. The terminal 100 includes multiple vibration motors. The vibration motor (not illustrated) or the multiple vibration motors may be mounted within the housing of the terminal 100.

The speaker 133 and the vibration motor may operate according to settings defined by the user of the terminal 100. Examples of the sound settings of the terminal 100 include a sound mode, a vibration mode, a sound and vibration mode, a silent mode, and the like. The sound settings of the terminal 100 may be set to one of a sound mode, a vibration mode, a sound and vibration mode, a silent mode, and the like. The control unit 110 may output a signal indicating the operation of the speaker 132 or the vibration motor according to a function performed by the terminal 100, based on the sound settings mode. The keypad receives a key input from the user in order to control the terminal 100. The keypad includes a physical keypad integrated into the terminal 100 or a virtual keypad displayed on the touch screen 171. The physical keypad integrated into the terminal 100 may be excluded according to the design or structure of the terminal 100.

The stylus pen may be configured to provide a signal which enables the touch screen 171 to detect a touch input. As the stylus pen approaches or contacts the touch screen 171, the touch screen 171 detects the signal provided by the stylus pen.

The GPS processing unit 140 receives a GPS signal from a GPS satellite, and calculates the current location of the terminal 100. When the control unit 110 processes an application which executes the method for providing notification information according to an embodiment of the present disclosure, or when the control unit 110 processes another application (as an example, a navigation application) which requires the current location of the user, the control unit 110 may send a request for the location of the user to the GPS processing unit 140, and the GPS processing unit 140 calculates and provides the location of the user to the control unit 110.

In accordance with the control unit 110, the storage unit 150 stores signals or data which are sent to or received from the communication module 120, the input/output module 130, the GPS processing unit 140, and the touch screen 171. The storage unit 150 stores control programs for controlling the terminal 100 or control programs for the control unit 110 and applications.

The term "storage unit" refers to any one of or a combination of the storage unit 150, the ROM 112 and the RAM 113 within the control unit 110, or a memory card, such as a Secure Digital (SD) card or a memory stick which is inserted into the terminal 100. The storage unit 150 includes non-volatile memory, volatile memory, Hard Disk Drive (HDD), Solid State Drive (SSD), and the like.

In accordance with the control unit 110, the power supply unit 160 may supply power to one or more batteries disposed in the housing of the terminal 100. The one or more batteries supply power to the terminal 100. The power supply unit 160 may supply power, which is provided by an external power source, to the terminal 100 through a wired cable connected to a connector integrated in the terminal 100. The power supply unit 160 may supply power, which is wirelessly provided by an external power source, to the terminal 100 through wireless charging technology.

The touch screen 171 may display User Interfaces (UIs) corresponding to various services and applications (as an example, telephone voice call, data transmission, etc.) the user based on an Operating System (OS) of the terminal 100. The touch screen 171 transmits analog signals corresponding to at least one touch, to the touch screen controller 172. The touch screen 171 may receive at least one touch as input from a user's body part (as an example, fingers, thumbs, etc.) or a touchable input means (as an example, the stylus pen).

The touch screen 171 may be implemented using a resistive type, a capacitive type, an infrared type, or an acoustic wave type touch sensor.

The touch screen controller 172 receives data from the control unit 110 and sends the data to the touch screen 171 for display to the user on the touch screen 171. The touch screen controller 172 converts analog signals received from the touch screen 171 into digital signals (as an example, X and Y coordinates), and provides the digital signals to the control unit 110. The control unit 110 controls the touch screen 171 by using the digital signals received from the touch screen controller 172. For example, the control unit 110 enables a shortcut icon displayed on the touch screen 171 to be selected in response to a touch event or a hovering event. According to embodiments of the present disclosure, the touch screen controller 172 may be included in the control unit 110.

Hereinafter, the methods according to embodiments of the present disclosure may be implemented under programmable commands which may be executed through various computing means, and may be recorded in a computer readable storage medium. The computer readable storage medium includes a program command set, a data file, a data structure, and the like, independently or in combination with one another. The program instructions recorded in the storage medium may be specifically designed and configured for the present disclosure, or may be known to and usable by those skilled in the field of computer software.

Particular embodiments of the present disclosure may be implemented under programmable command and stored in the storage unit 150 of the terminal 100, and the program command may be temporarily stored in RAM 113 included in the controller 110 in order to execute the methods according to the embodiments of the present disclosure. The controller 110 controls hardware components included in the terminal 100 in accordance with the program commands based on the methods according to the embodiments of the present disclosure, temporarily or continuously store data generated while the methods according to the embodiments of the present disclosure are executed in the control unit 110, and provide the User Interface (UI) required for executing the methods according to the embodiments of the present disclosure to the touch screen controller 172.

Figure 2:
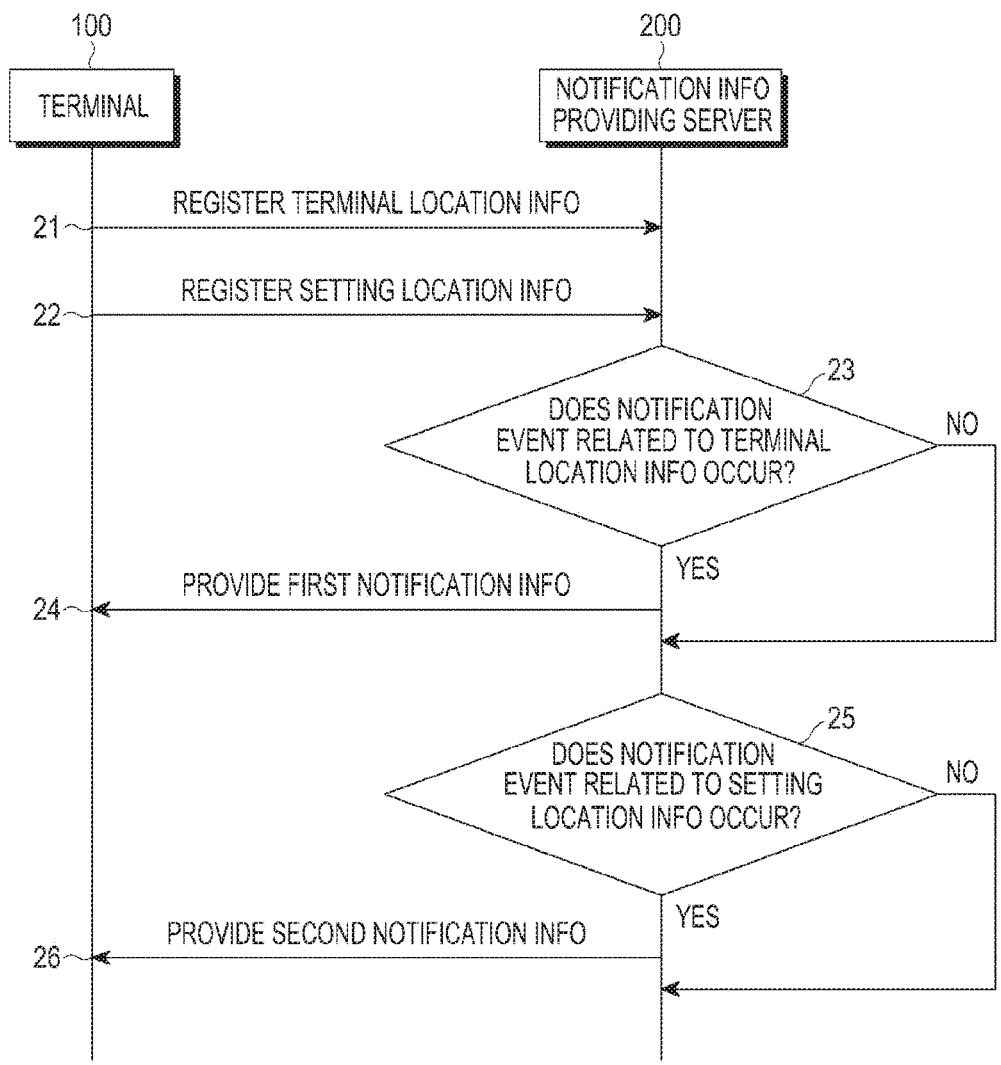
FIG. 2 is a signal flowchart illustrating an example of a method for providing notification information according to an embodiment of the present disclosure.

FIG. 2 is a signal flowchart illustrating an example of a method for providing notification information to the user of terminal 100 according to an embodiment of the present disclosure. A notification information providing server 200 may include, for example, all or some of the components of the terminal 100 shown in FIG. 1.

Referring to FIG. 2, according to the execution of the method for providing notification information, in step 21, the terminal 100 identifies terminal location information in geographic area including the terminal 100, and registers the identified terminal location information in a notification information providing server 200. The user freely moves about the area while carrying the terminal 100, and thus the location of the terminal 100 may be changed according to the movement of the user. The terminal 100 identifies the terminal location information at a predetermined time, and registers the identified terminal location information in the notification information providing server 200. As another example, the terminal 100 may identify and store the terminal location information at a predetermined time, and registers the identified terminal location information in the notification information providing server 200 when the identified terminal location information is different from the previously stored terminal location information.

In step 22, the terminal 100 provides a UI to the user and receives at least one piece of setting location information in geographic area which is defined by the user, and registers the at least one piece of setting location information in the notification information providing server 200.

In step 22, the user requests notification information on multiple geographic areas through the method for providing notification information. In step 22, the terminal 100 provides a UI to the user configured to enable the user to define multiple geographic areas, and may be configured to register multiple pieces of setting location information, which are defined by the user, in the notification information providing server 200.

Steps 23 to 26 may be performed according to the occurrences of notification events corresponding to the terminal location information and the at least one piece of setting location information which are registered in the notification information providing server 200. For example, the notification information providing server 200 may set the terminal location information and the at least one piece of setting location information, and may determine whether a notification event related to a corresponding area has occurred. When a notification event occurs corresponding to the terminal location information and the at least one piece of setting location information, the notification information providing server 200 provides corresponding notification information to the terminal 100. Specifically, when it is determined in step 23 that a notification event related to the terminal location information has occurred, in step 24 the notification information providing server 200 provides the terminal 100 with first notification information corresponding to the terminal location information. When it is determined in step 25 that a notification event related to the at least one piece of setting location information has occurred, in step 26 the notification information providing server 200 provides the terminal 100 with second notification information corresponding to the at least one piece of setting location information.

The user of the terminal 100 may freely move about carrying the terminal 100, and thus changing the location of the terminal 100. Accordingly, the notification information providing server 200 provides the first notification information corresponding to a geographic area where the terminal 100 is currently located. The notification information providing server 200 may be configured to update the current terminal location information and to provide the first notification information on the updated terminal location information when the terminal location information provided by the terminal 100 changes. As another example, the notification information providing server 200 may be configured to store terminal location information and to provide first notification information corresponding to the stored terminal location information. For example, after the notification information providing server 200 stores first terminal location information in a first geographic area where the terminal 100 was located, the location of the terminal 100 is changed to be within a second geographic area, and the notification information providing server 200 stores the second terminal location information. The notification information providing server 200 determines whether notification information events have occurred which respectively correspond to the first terminal location information and the second terminal location information. The notification information providing server 200 may be configured to provide the terminal 100 with multiple pieces of first notification information corresponding to the first terminal location information and the second terminal location information.

The first notification information and the second notification information includes at least one piece of information among weather information, news information, shopping information, environmental information, sports information, entertainment information, social media information, personal family information, disaster information and the like.

The method for providing notification information, according to an embodiment of the present disclosure, may be configured to provide second notification information to a preset contact. The method for providing notification information to a preset contact according to an embodiment of the present disclosure provides a User Interface (UI) to the user of the terminal 100 requesting contact information corresponding to at least one piece of setting location information provide the contact to the notification information providing server 200. Accordingly, when a notification event occurs related to the at least one piece of setting location information, the notification information providing server 200 may provide the at least one piece of second notification information to an electronic device corresponding to the contact preset by the user. As another example, the method for providing notification information to a contact provides a User Interface (UI) to the user of the terminal 100 requesting contact information and store the contact in the terminal 100. The terminal 100 receives the at least one piece of second notification information from the notification information providing server 200, and provides the at least one piece of second notification information to an electronic device corresponding to the preset contact. For example, the terminal 100 may transmit a message, which includes the second notification information, to the electronic device corresponding to the preset contact by using a preset communication means, for example, an SMS, an MMS, an email, a social message, a messenger service, and the like. For example, the second notification information includes location information of the electronic device corresponding to the preset contact, and the terminal 100 may provide the electronic device with information on the geographic area where the electronic device is currently located.

Figure 3:
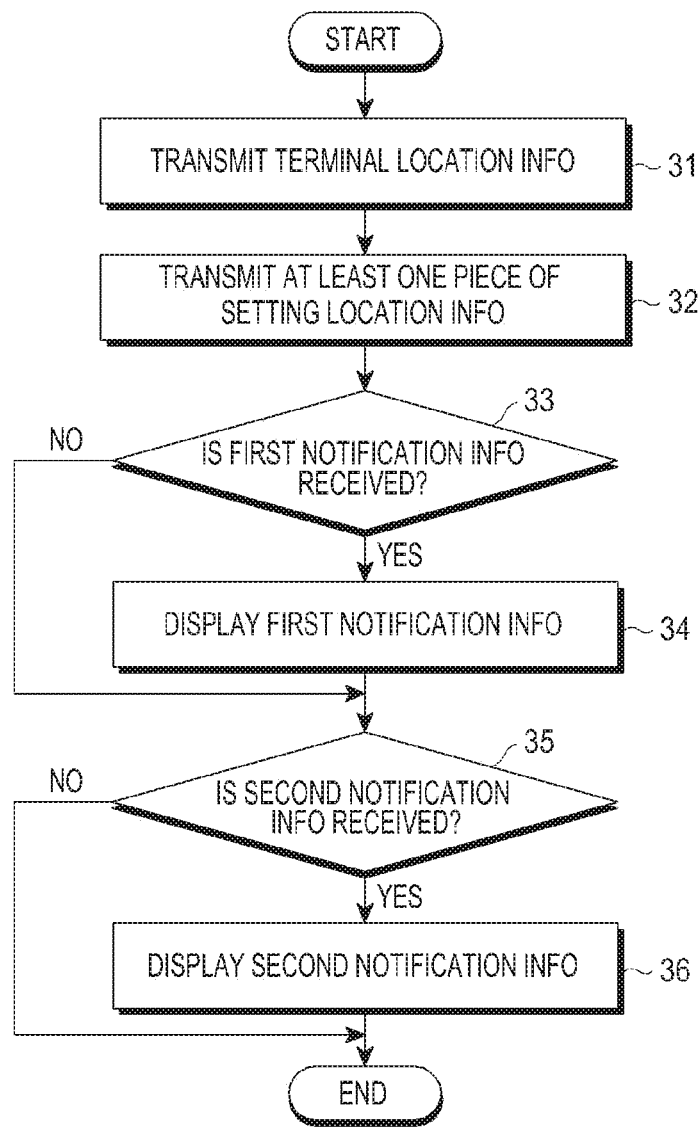
FIG. 3 is a flowchart illustrating the flow of steps in which a method for providing notification information is performed by a terminal according to an embodiment of the present disclosure.

FIG. 3 is a flowchart illustrating the flow of steps in which a method for providing notification information is performed by a terminal according to an embodiment of the present disclosure.

As the terminal executes an application which processes the method for providing notification information, an operation may be started. When the application which processes the method for providing notification information is executed, in step 31 the terminal 100 identifies the terminal location information in a geographic area including the terminal 100, and provides the identified terminal location information to the notification information providing server 200.

Figure 4A:
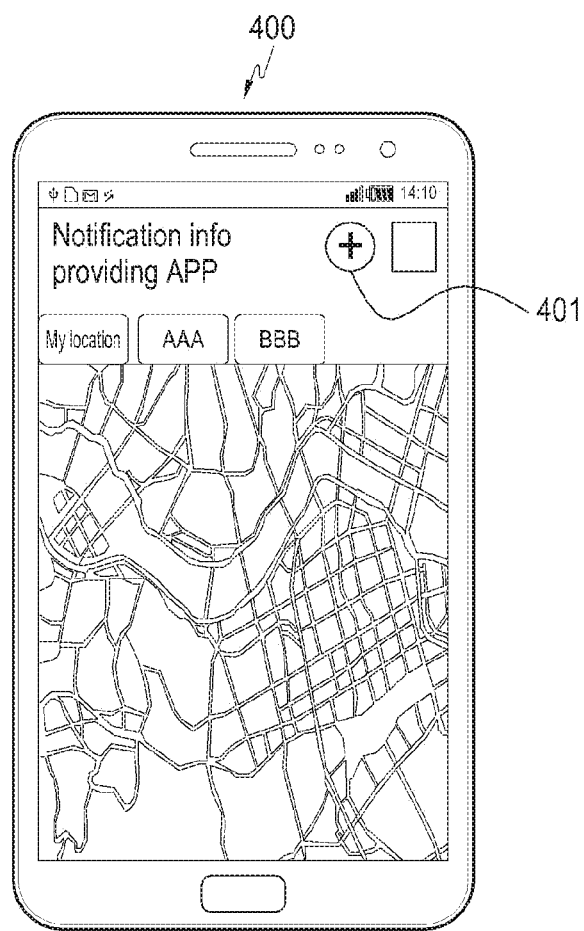
FIGS. 4A to 4C are screen shots illustrating examples of a user interface provided by a method for providing notification information according to an embodiment of the present disclosure.

The terminal 100 displays a User Interface (UI) menu 400 (as shown in FIG. 4A) provided by the application which processes the method for providing notification information. The menu includes a location addition icon 401 which enables a user to register a desired geographic area. In step 32, the terminal 100 receives as input from the user, an area desired by the user through the location addition menu 401, identifies at least one piece of setting location information in the area which is preset by the user, and provides the at least one piece of setting location information to the notification information providing server 200.

Figure 4B:
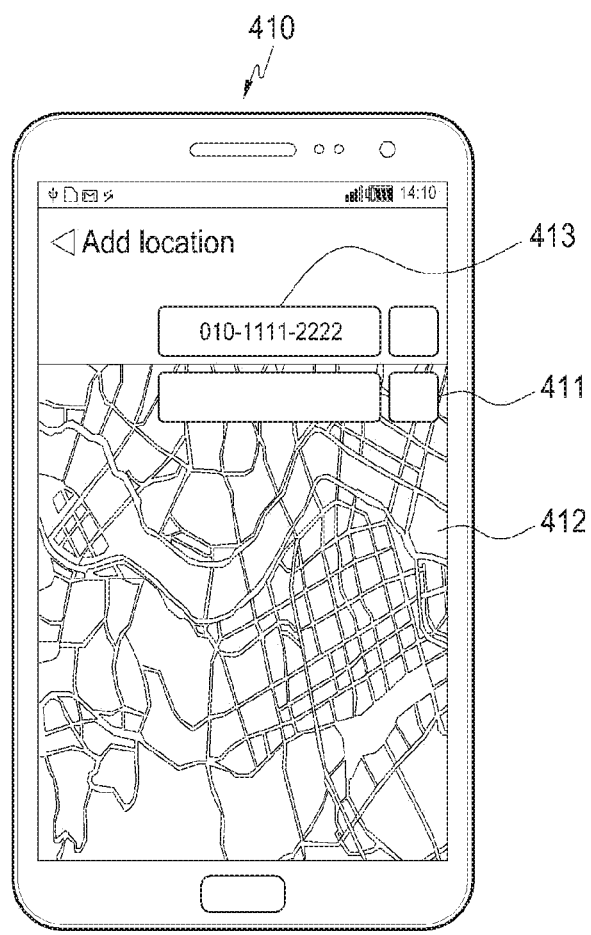

For example, when the location addition icon 401 is selected, the terminal 100 displays a location registration interface 410 (as shown in FIG. 4B). The location registration interface 410 includes a search window 411, a map 412, and the like, which enables the user to enter text and search for a desired area.

When notification events occur corresponding to the terminal location information and the at least one piece of setting location information which are registered in the notification information providing server 200, the terminal 100 receives relevant notification information (first notification information and/or second notification information) from the notification information providing server 200, and provides the relevant notification information. Accordingly, steps 33 to 36 may be performed according to the occurrence of notification events corresponding to the terminal location information and the at least one piece of setting location information which are registered in the notification information providing server 200.

For example, when a notification event occurs related to the terminal location information, in step 33 the notification information providing server 200 provides the terminal 100 with first notification information corresponding to the terminal location information, and the terminal 100 receives first notification information from the notification information providing server 200. In step 34, the terminal 100 displays the first notification information through a UI. When a notification event occurs related to the at least one piece of setting location information, in step 35 the notification information providing server 200 may provide the terminal 100 with second notification information corresponding to the notification event related to the at least one piece of setting location information, and the terminal 100 receives the second notification information from the notification information providing server 200. In step 36, the terminal 100 displays the second notification information through the UI.

Figure 4C:
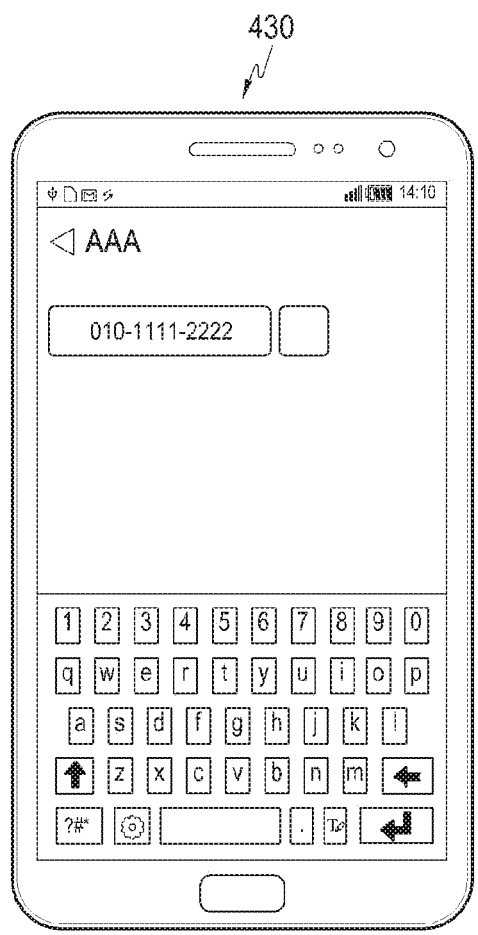

The method for providing notification information, according to an embodiment of the present disclosure, may be configured to provide the second notification information to a preset contact. The location registration interface 410 includes a contact input menu 413 which enables the user of the terminal 100 to enter the contact information of the preset contact defined to receive the notification information. The terminal 100 transmits to the notification information providing server 200, the contact information of the user corresponding to the at least one piece of setting location information. Although an example has been described in which the location registration interface 410 includes the contact input menu 413, embodiments of the present disclosure are not limited thereto. For example, the menu 400 includes a contact registration menu 413 which enables the registration of a contact, and the terminal 100 may display a contact registration interface 430 (as shown in FIG. 4C) when the contact registration menu 413 is selected by the user. The terminal 100 receives as input and stores the contact of the user through the contact registration interface 430.

The terminal 100 stores the contact of the user. When the notification information providing server 200 provides the at least one piece of second notification information, the terminal 100 provides the second notification information to an electronic device corresponding to the contact. For example, the terminal 100 may transmit a message, which includes the second notification information, to the electronic device corresponding to the contact by using a preset communication means, for example, an SMS, an MMS, a social messaging service, a messenger, and the like. For example, the second notification information includes location information of the electronic device corresponding to the contact, and the terminal 100 may provide the electronic device with information on an area where the electronic device is currently located.

Figure 5:
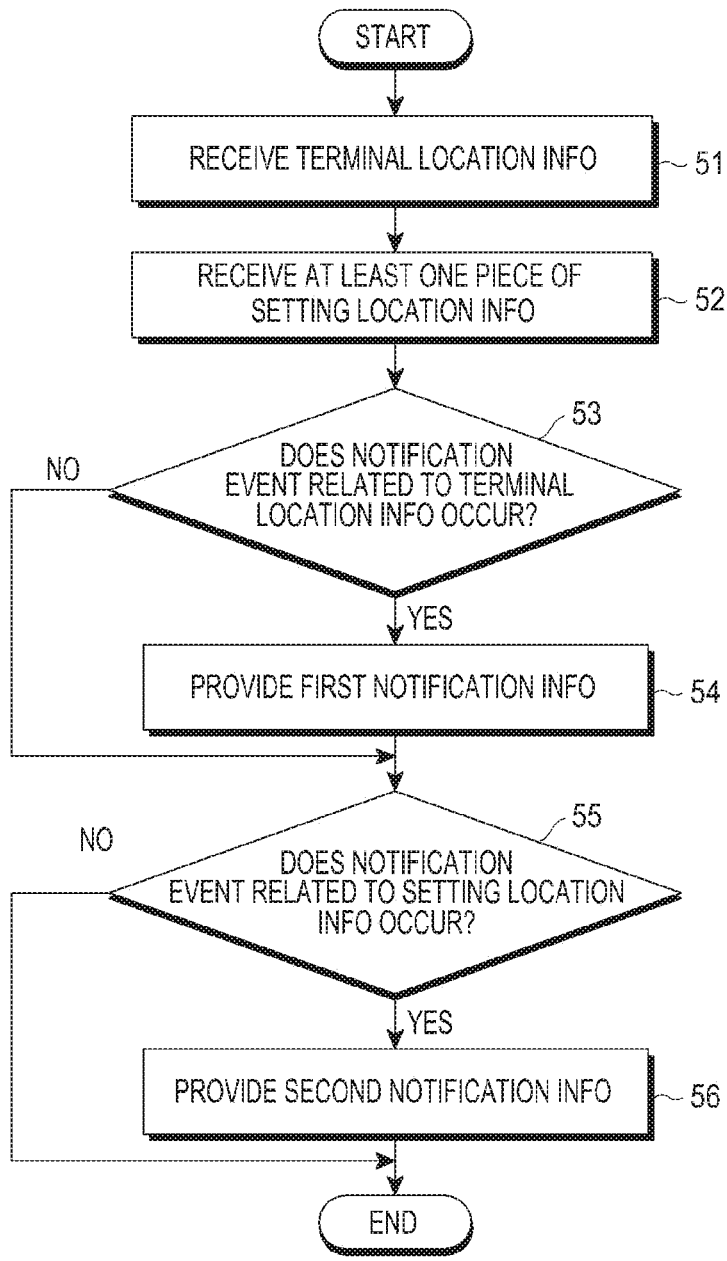
FIG. 5 is a flowchart illustrating the flow of steps in which a method for providing notification information is performed by a notification information providing server according to an embodiment of the present disclosure.

FIG. 5 is a flowchart illustrating the flow of steps in which a method for providing notification information is performed by a notification information providing server according to an embodiment of the present disclosure.

Referring to FIG. 5, in step 51, the notification information providing server 200 receives from the terminal 100, terminal location information in geographic area including the terminal 100, and registers the received terminal location information in the notification information providing server 200. The user moves about carrying the terminal 100, and thus the location of the terminal 100 may be changed according to the movement of the user. Accordingly, the notification information providing server 200 receives terminal location information from the terminal 100 at a predetermined time period or according to a change in the location of the terminal 100.

In step 52, the notification information providing server 200 receives at least one piece of setting location information in an area, which is defined by the user from the terminal 100, and registers the received setting location information in the notification information providing server 200. The user may request notification information on multiple geographic areas through the methods for providing notification information. Accordingly, in step 52, the notification information providing server 200 may receive multiple pieces of setting location information from the terminal 100, and may register the multiple pieces of setting location information.

Steps 53 to 56 may be performed according to the occurrence of notification events corresponding to the terminal location information and the at least one piece of setting location information which are registered in the notification information providing server 200. For example, when it is determined in step 53 that a notification event related to the terminal location information occurs, in step 54 the notification information providing server 200 may provide the terminal 100 with first notification information corresponding to the terminal location information. When it is determined in step 55 that a notification event related to the at least one piece of setting location information occurs, in step 56 the notification information providing server 200 may provide the terminal 100 with second notification information corresponding to the at least one piece of setting location information.

The notification information providing server 200 receives from the terminal 100, a user defined contact corresponding to the at least one piece of setting location information. Accordingly, when a notification event occurs which is related to the at least one piece of setting location information, the notification information providing server 200 provides the at least one piece of second notification information to an electronic device corresponding to the user defined contact. As another example, when there notification event occurs related to the at least one piece of setting location information, the notification information providing server 200 transmits the at least one piece of second notification information to the terminal 100 so as to enable the terminal 100 to provide the at least one piece of second notification information to the electronic device corresponding to the contact. For example, the terminal 100 may transmit a message which includes the second notification information, to the electronic device corresponding to the contact by using a preset communication means, for example, an SMS, an MMS, a social messaging service, a messenger, and the like. For example, the second notification information includes location information of the electronic device corresponding to the contact, and the terminal 100 may provide the electronic device with information on a geographic area where the electronic device is currently located.

Various embodiments disclosed herein are provided to describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. A method for providing notification information in a server, the method comprising:

identifying, by a processor of the server, terminal location information including a current location of a first terminal;

identifying, by the processor, setting location information corresponding to an area which is set by the first terminal, wherein the setting location information includes information about at least one location different from the current location of the first terminal;

identifying, by the processor, a second terminal corresponding to the setting location information;

upon a first notification event corresponding to the terminal location information occurring, transmitting, by a communication interface of the server, first notification information corresponding to the first notification event to the first terminal;

upon a second notification event corresponding to the setting location information occurring regardless of a current location of the second terminal, transmitting, by the communication interface, second notification information corresponding to the second notification event to the first terminal and the second terminal;

upon a disaster or a weather accident occurring in the setting location, determining, by the processor, that the second notification event occurs; and generating, by the processor, the second notification information including the current location of the second terminal, wherein the second terminal is pre-registered in the first terminal.

2. The method of claim 1, wherein each of the first notification information and the second notification information includes weather information, news information, shopping information, environmental information, sports information, entertainment information, social media information, personal family information or disaster information.

3. The method of claim 1, further comprising:

periodically obtaining, by the processor, a current location of the first terminal; comparing, by the processor, the current location of the first terminal with a previous location of the first terminal; and if the location of the terminal is changed, providing, by the processor, notification information corresponding to the changed location of the first terminal to the first terminal.

4. A server for providing notification information, the server comprising:

a communication interface; and a processor configured to:

identify terminal location information including a current location of a first terminal, identify setting location information corresponding to an area which is set by the first terminal, wherein the setting location information includes information about at least one location different from the current location of the first terminal, identify a second terminal corresponding to the setting location information, upon a first notification event corresponding to the terminal location information occurring, control the communication interface to transmit first notification information corresponding to the first notification event to the first terminal, and upon a second notification event corresponding to the setting location information occurring regardless of a current location of the second terminal, control the communication interface to transmit second notification information corresponding to the second notification event to the first terminal and the second terminal, upon a disaster or a weather accident occurring in the setting location, determine that the second notification event occurs, and generate the second notification information including the current location of the second terminal, wherein the second terminal is pre-registered in the first terminal.

5. The server of claim 4, wherein each of the first notification information and the second notification information includes weather information, news information, shopping information, environmental information, sports information, entertainment information, social media information, personal family information or disaster information.

6. The server of claim 4, wherein the processor is further configured to periodically obtain a current location of the first terminal.

7. The server of claim 6, wherein the processor is further configured to:

compare the current location of the first terminal with a previous location of the first terminal, and if the location of the terminal is changed, provide notification information corresponding to the changed location to the first terminal.

* * * * *